(12) United States Patent
Chen

(10) Patent No.: US 7,237,854 B2
(45) Date of Patent: Jul. 3, 2007

(54) COMPUTER ENCLOSURE INCORPORATING MOUNTING APPARATUS FOR DISK DRIVES

(75) Inventor: Yun-Lung Chen, Tu-Chen (TW)

(73) Assignee: Hon Hai Precision Ind. Co., Ltd, Taipei Hsien (TW)

( * ) Notice: Subject to any disclaimer, the term of this patent is extended or adjusted under 35 U.S.C. 154(b) by 364 days.

(21) Appl. No.: 10/660,327

(22) Filed: Sep. 10, 2003

(65) Prior Publication Data
US 2004/0201333 A1   Oct. 14, 2004

(30) Foreign Application Priority Data
Apr. 9, 2003   (TW) .............................. 92205562 U

(51) Int. Cl.
*A47B 97/00* (2006.01)

(52) U.S. Cl. ................................ 312/223.2

(58) Field of Classification Search ............ 312/223.1, 312/223.2, 257.1, 265.5; 361/683, 685, 724, 361/725
See application file for complete search history.

(56) References Cited

U.S. PATENT DOCUMENTS 5,600,538 A * 2/1997 Xanthopoulos ............. 361/683
5,768,097 A * 6/1998 Jelinger ....................... 361/683
6,018,457 A * 1/2000 Mroz ........................... 361/685
6,040,980 A * 3/2000 Johnson ....................... 361/685
6,137,678 A * 10/2000 Gebara et al. ............. 361/685
6,227,631 B1 * 5/2001 Lin et al. ................. 312/223.2
6,646,872 B1 * 11/2003 Chen ........................... 361/685

FOREIGN PATENT DOCUMENTS

TW   77200511      3/1989
TW   89202464    12/2001
TW   91208385   *  7/2002

\* cited by examiner

*Primary Examiner*—James O. Hansen
(74) *Attorney, Agent, or Firm*—Wei Te Chung

(57) ABSTRACT

A computer enclosure comprises a control panel portion with a moveable dust-proof cover, a U-shaped top cover, a base having a slideway, and a computer chassis. The computer chassis can insert in or draw out of between the U-shaped top cover and the base. A bottom portion of the computer chassis has a slide thereon, corresponding to the slideway of the base. A supporting plate is mounted on a middle portion of the top cover for supporting the power supply. A front portion of the top cover has a securing plate for mounting a plurality of brackets thereon. The securing plate defines an upper opening and a low opening therein, corresponding to the brackets. A plurality of truckles is mounted on a bottom position of the base for convenient movement of the base.

21 Claims, 8 Drawing Sheets

COMPUTER ENCLOSURE INCORPORATING MOUNTING APPARATUS FOR DISK DRIVES

BACKGROUND OF THE INVENTION

1. Field of the Invention

The present invention relates to a computer enclosure, and more particularly to a computer enclosure incorporating a mounting apparatus for readily and securely mounting a plurality of disk drives therein.

2. Description of Related Art

A conventional computer enclosure includes a plurality of mounting apparatuses receiving hard disk drives (HDDs), floppy disk drives (FDDs) or CD-ROM drives. As disclosed in Taiwan Patent Application No. 77200511, a typical mounting apparatus is fixed in a computer enclosure. A plurality of disk drives is secured in the mounting apparatus by means of a plurality of screws. Each disk drive must be individually screwed into place. Fixing a plurality of screws is unduly laborious and time-consuming, as is removing the screws in disassembly. In addition, when the screws are being manipulated, an operator is prone to bump and damage other nearby components fixed in the computer enclosure because of the confined space within a typical computer enclosure.

Another typical mounting apparatus is disclosed in Taiwan Patent Application No. 89202464. Firstly, a plurality of disk drives is secured in a mounting apparatus. The mounting apparatus including the disk drives therein is fixed in a computer enclosure via a plurality of screws. Again, assembly and disassembly are unduly laborious, time-consuming and unsafe.

SUMMARY OF THE INVENTION

Accordingly, an object of the present invention is to provide a computer enclosure incorporating a mounting apparatus for readily and firmly mounting a plurality of disk drives therein.

To achieve the above-mentioned object, a computer enclosure comprises a chassis, a mounting apparatus and a movable plate pivotably. The chassis comprises a bottom plate and a front plate. The mounting apparatus is fixedly mounted to the front plate and comprises a first bracket receiving a plurality of disk drives and a fixed plate below the first bracket. The movable plate is attached to the front plate below the first bracket opposite to the fixed plate. The movable plate comprises a first flange and a second flange at two opposite ends thereof for attaching to the bottom plate and the first bracket securely. Wherein the fixed plate and the movable plate cooperates to form a second bracket for receive a plurality of disk drives therein securely. In assembly, the movable plate is attached to the first bracket and the bottom plate securely.

Other objects, advantages and novel features of the present invention will become more apparent from the following detailed description when taken in conjunction with the accompanying drawings, in which:

DETAILED DESCRIPTION OF THE INVENTION

Figure 1:
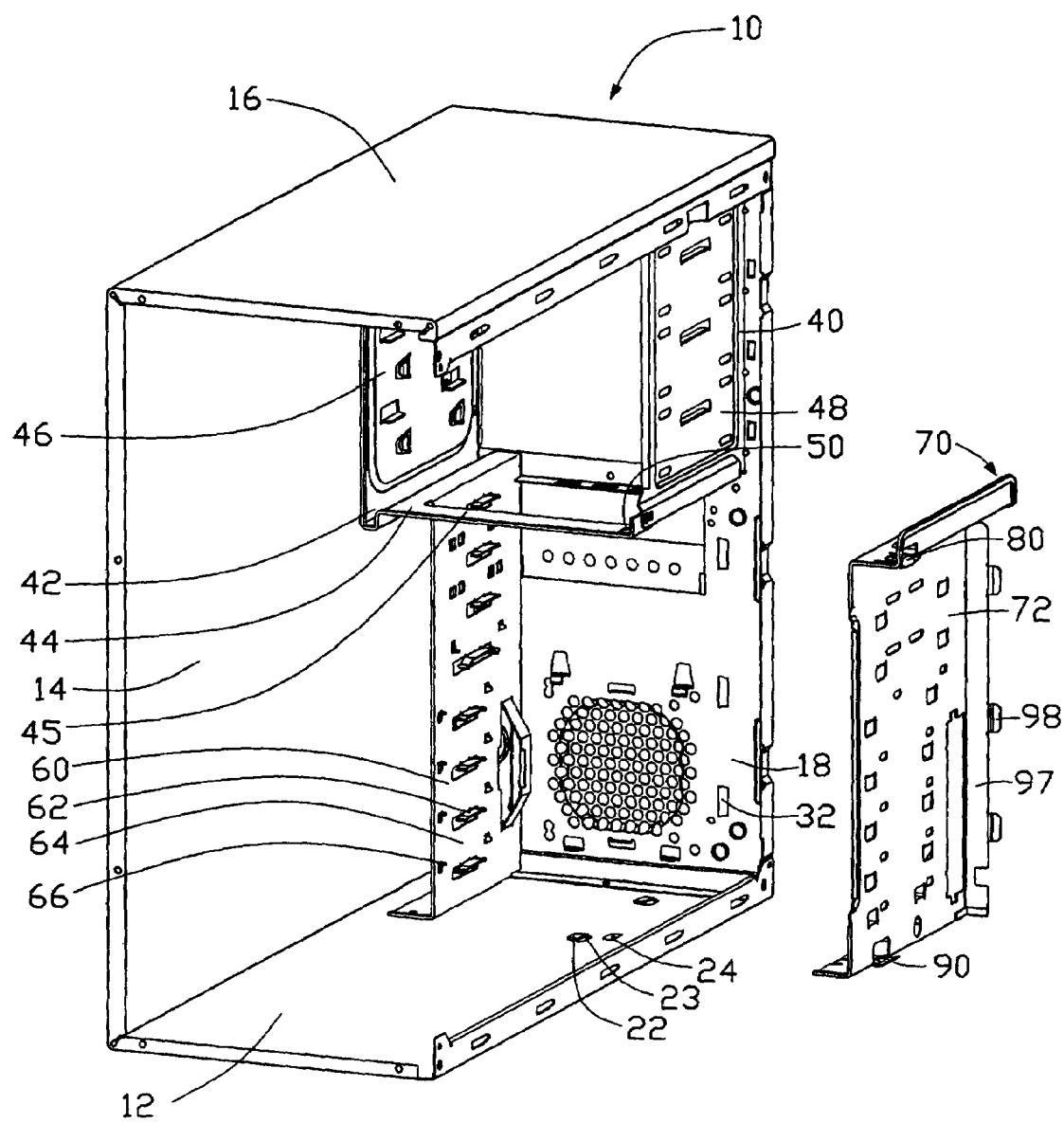
FIG. 1 is an exploded, isometric view of a computer enclosure in accordance with a preferred embodiment of the present invention.

Referring to FIGS. 1–5, a computer enclosure in accordance with the preferred embodiment of the present invention includes a chassis 10, a mounting apparatus 40 and a movable plate 70. The computer enclosure receives a plurality of disk drives 100, each defining a plurality of apertures (not labeled) in a respective side wall thereof.

The chassis 10 comprises a bottom plate 12, a side plate 14, a top plate 16, and a front plate 18. The bottom plate 12 and the top plate 16 extend perpendicularly from the side plate 14 in a same direction. The front plate 18 is fixed at respective ends of the bottom plate 12, the side plate 14 and the top plate 16. Two protrusions 22 are stamped inwardly from a portion of the bottom plate 12 distal from the side plate 14, thereby defining two cavities 23. A first locking hole 24 is defined in the bottom plate 12 near one of the protrusions 22. A plurality of vertically aligned receiving openings 32 is defined in one side of a lower portion of the front plate 18 distal from the side plate 14.

The mounting apparatus 40 is fixedly mounted to an inside of the front plate 18 of the chassis 10. The mounting apparatus 40 includes a first bracket 42 and a fixed plate 60. The first bracket 42 comprises a bottom panel 44, and two parallel side panels 46, 48. The bottom panel 44 extends integrally from a bottom end of the side panel 46. The side panel 48 is stamped perpendicularly from the front plate 18 above the receiving openings 32. The fixed plate 60 integrally depends from a side of the bottom panel 44 adjacent the side panel 46, and is perpendicular to the front plate 18. The fixed plate 60, the side panel 46 and the bottom panel 44 are thus formed as a single piece. This single piece is fixed to the top plate 16, the bottom plate 12 and the front plate 18. The bottom panel 44 comprises a transverse bar 45 interconnecting the side panels 46, 48. A second locking hole 50 is defined in a distal end of the bar 45. The bar 45 is attached to a bottom end of the side panel 48 by means of a fastener such as a screw or a rivet. The bottom panel 44 and the side panels 46, 48 thereby cooperatively form the first bracket 42. A plurality of first supporting tabs 62 is stamped inwardly from the fixed plate 60, one above the other. A first receiving section 64 is defined between each two adjacent first supporting tabs 62, for receiving a respective disk drive 100 thereat. Two spaced positioning pins 66 are stamped inwardly from the fixed plate 60 generally between each two adjoining first supporting tabs 62, for insertion into the apertures of the side wall of the respective disk drive 100. For each said two positioning pins 66, a front one thereof is oriented vertically, and a rear one thereof is oriented horizontally.

Figure 2:
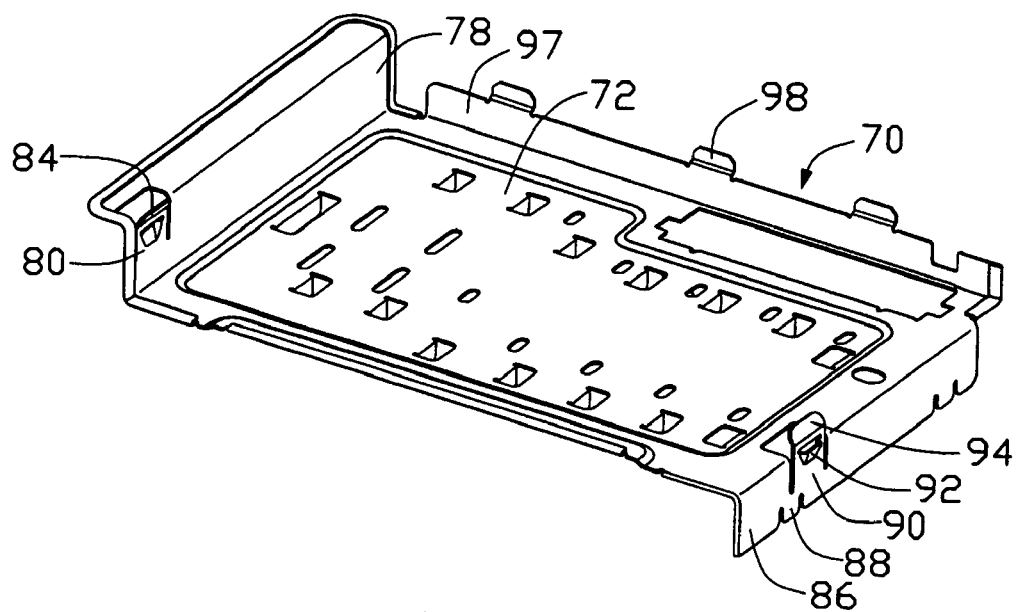
FIG. 2 is an enlarged, isometric view of a movable plate of the computer enclosure of FIG. 1.
Figure 3:
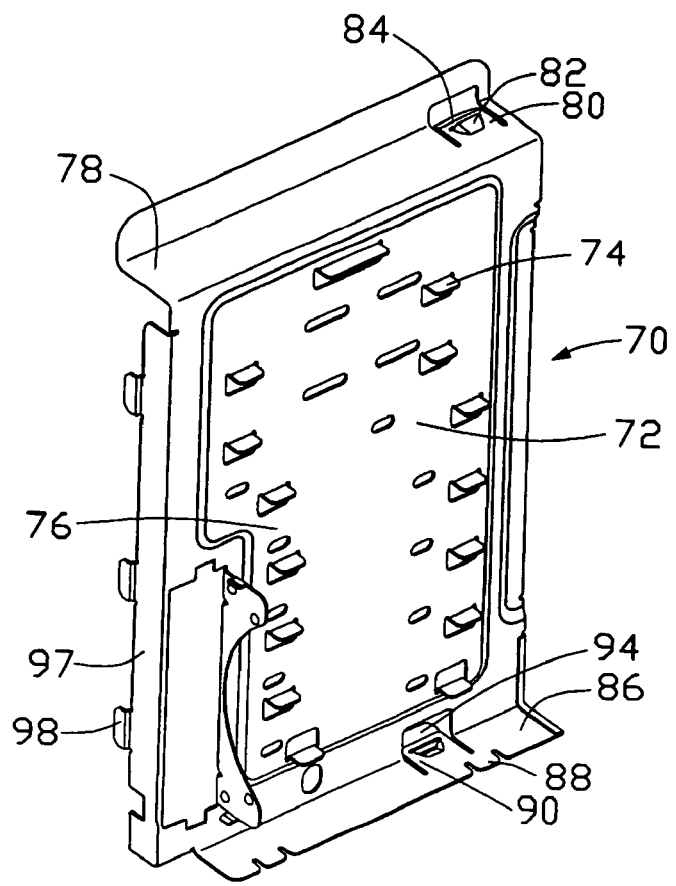
FIG. 3 is an enlarged, isometric view of the movable plate of the computer enclosure of FIG. 1, viewed from another aspect.

Referring to FIGS. 2–3, the movable plate 70 is detachably attached to the front plate 18, and comprises a main body 72. A plurality of second supporting tabs 74 is stamped inwardly from the main body 72, corresponding to the first supporting tabs 62. A second receiving section 76 is defined between each two adjacent second supporting tabs 74, and cooperates with a corresponding first receiving section 64 to receive a respective disk drive 100 therebetween. A first flange 86 extends perpendicularly inwardly from a bottom of the main body 72. Two inserting tabs 88 are respectively formed at two sides of the first flange 86, for inserting into the cavities 23 of the bottom plate 12. A first resilient tab 90 is formed from the first flange 86, corresponding to the first locking hole 24 of the bottom plate 12. A distal end of the first resilient tab 90 is bent to form a first handle 94. A first locking tab 92 is stamped outwardly from the first resilient tab 90 near the first handle 94, for engaging in the first locking hole 24 and thereby attaching the first flange 86 to the bottom plate 12. A second flange 78 extends perpendicularly outwardly from a top of the main body 72. A second resilient tab 80 is formed from the second flange 78, corresponding to the bar 45 of the bottom panel 44. The second resilient tab 80 is configured substantially the same as the first resilient tab 90. In particular, the second resilient tab 80 comprises a second handle 84, and a second locking tab 82 for engaging in the second locking hole 50 and thereby attaching the second flange 78 to the bar 45. A third flange 97 extends perpendicularly outwardly from a front of the main body 72, and is located generally between the first flange 86 and the second flange 78. A plurality of tabs 98 extends from the third flange 97, for insertion into the receiving openings 32. When the tabs 98 are received in the receiving openings 32, the movable plate 70 can rotate about the tabs 98. When the movable plate 70 is fully assembled in the chassis 10, the movable plate 70 cooperates with the fixed plate 60 to form a second bracket (not labeled) for receiving a plurality of disk drives 100 therein.

Figure 4:
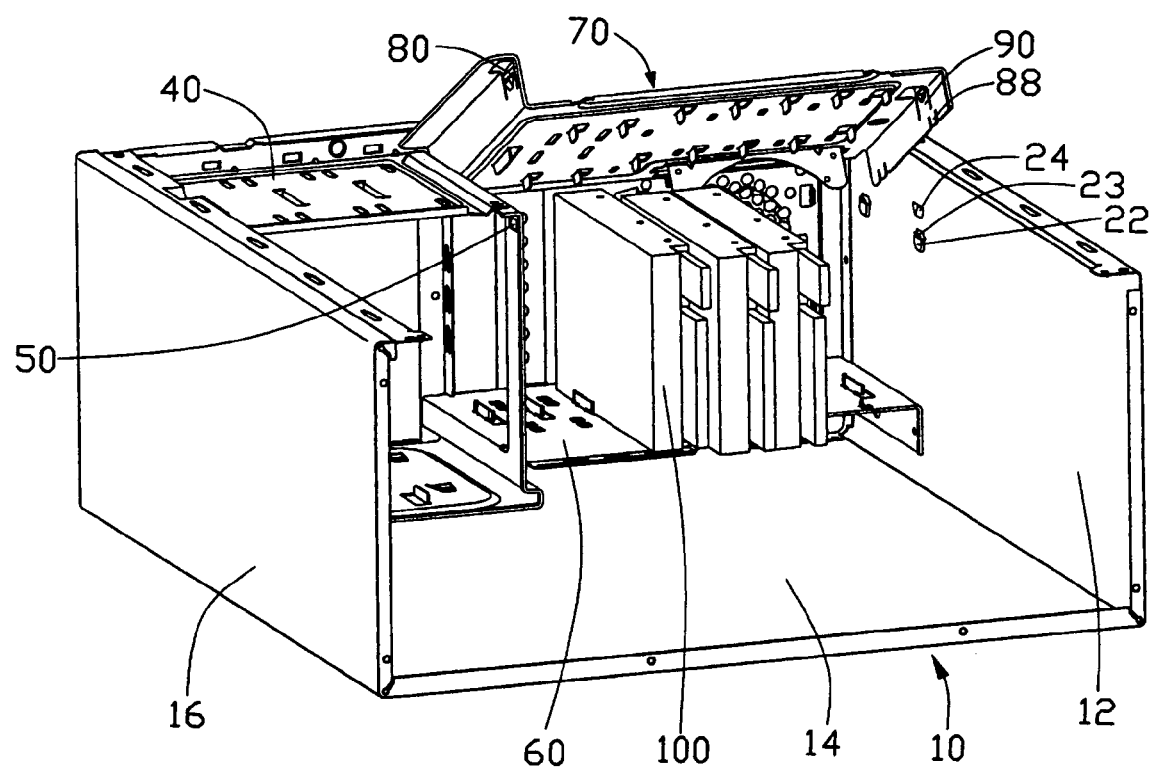
FIG. 4 is a partly assembled view of FIG. 1, but showing the computer enclosure oriented such that a side plate thereof is bottommost.
Figure 5:
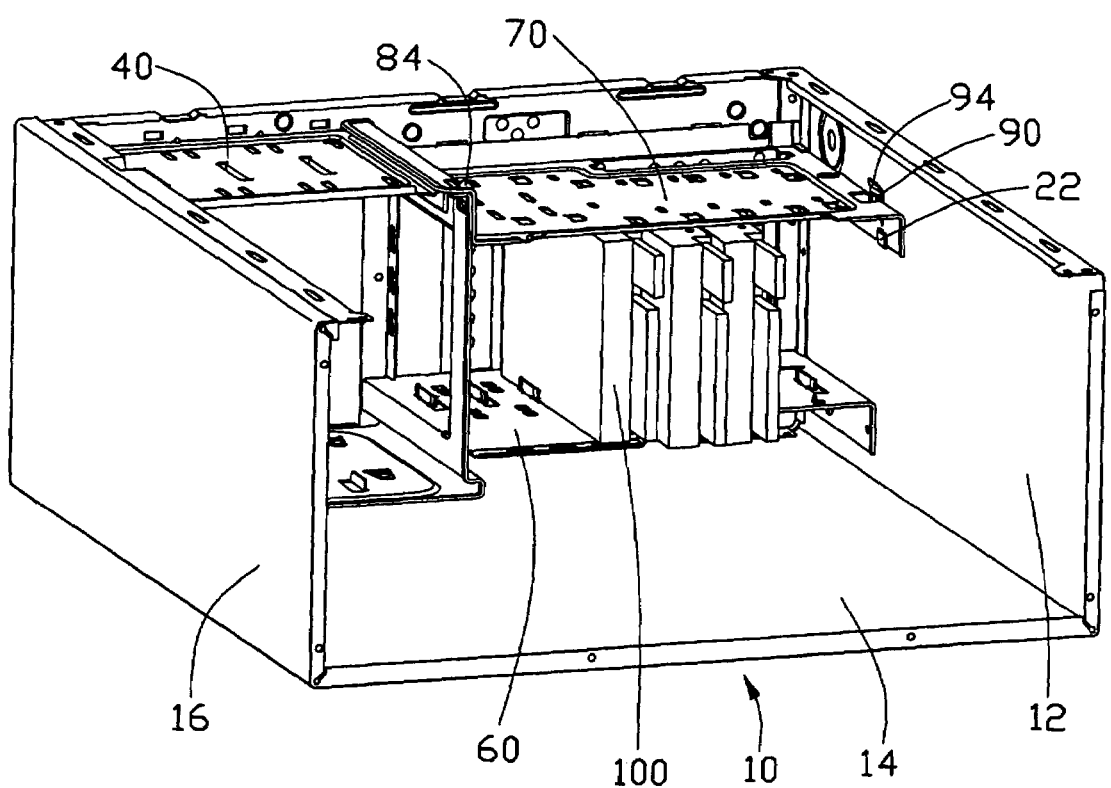
FIG. 5 is a fully assembled view of FIG. 4.
Figure 6:
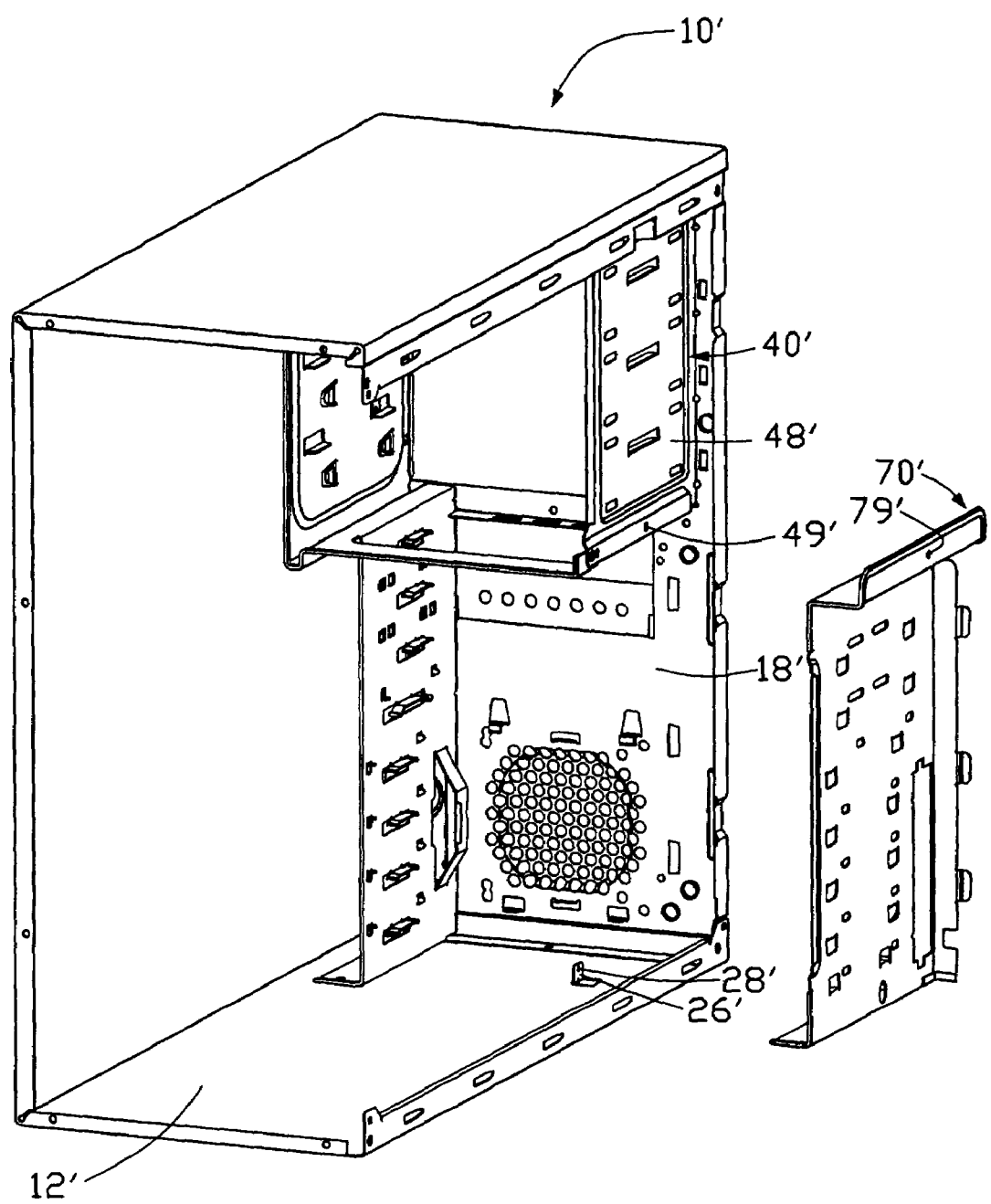
FIG. 6 is an exploded, isometric view of a computer enclosure in accordance with an alternative embodiment of the present invention.
Figure 7:
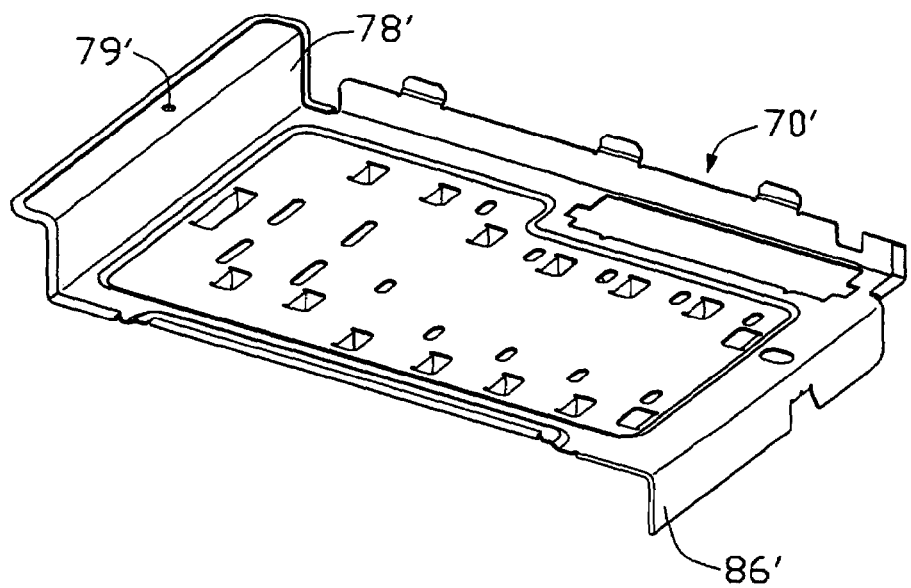
FIG. 7 is an enlarged, isometric view of a movable plate of the computer enclosure of FIG. 6.
Figure 8:
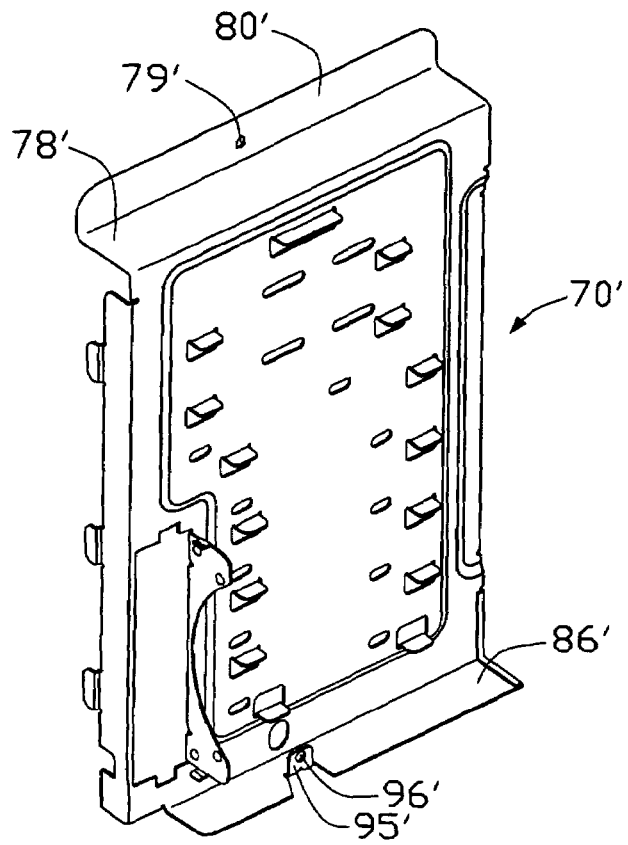
FIG. 8 is an enlarged, isometric view of the movable plate of the computer enclosure of FIG. 6, viewed from another aspect.
Figure 9:
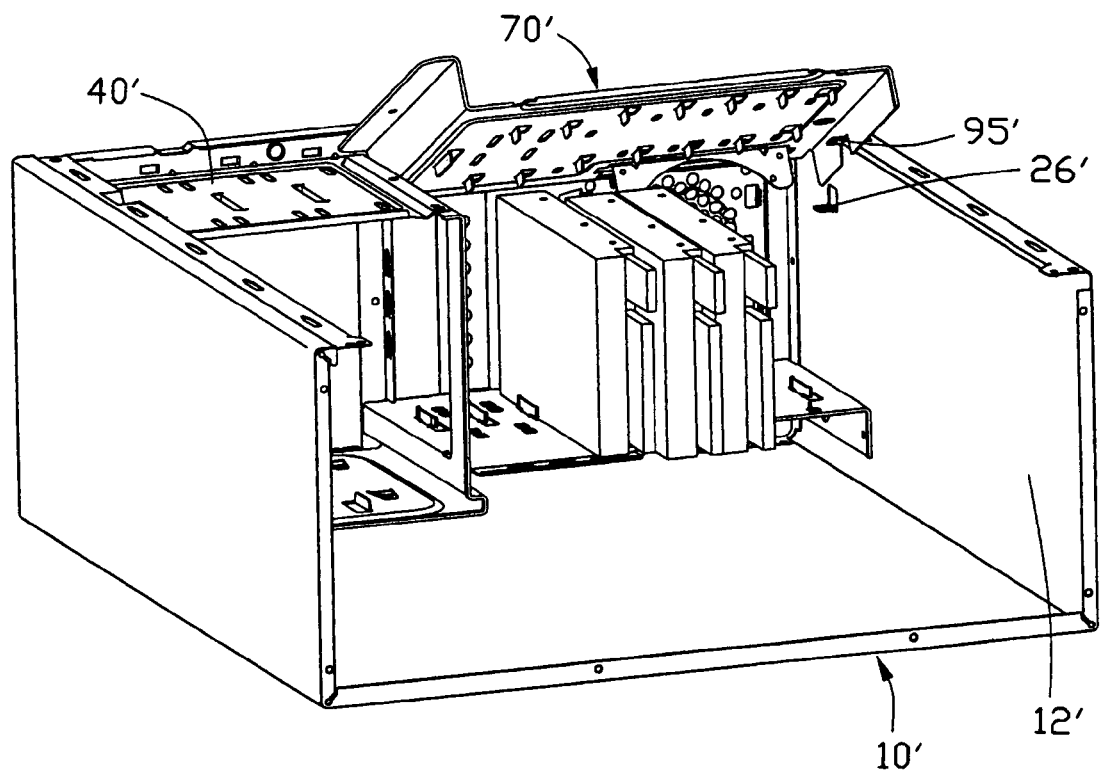
FIG. 9 is a partly assembled view of FIG. 6, but showing the computer enclosure oriented such that a side plate thereof is bottommost.
Figure 10:
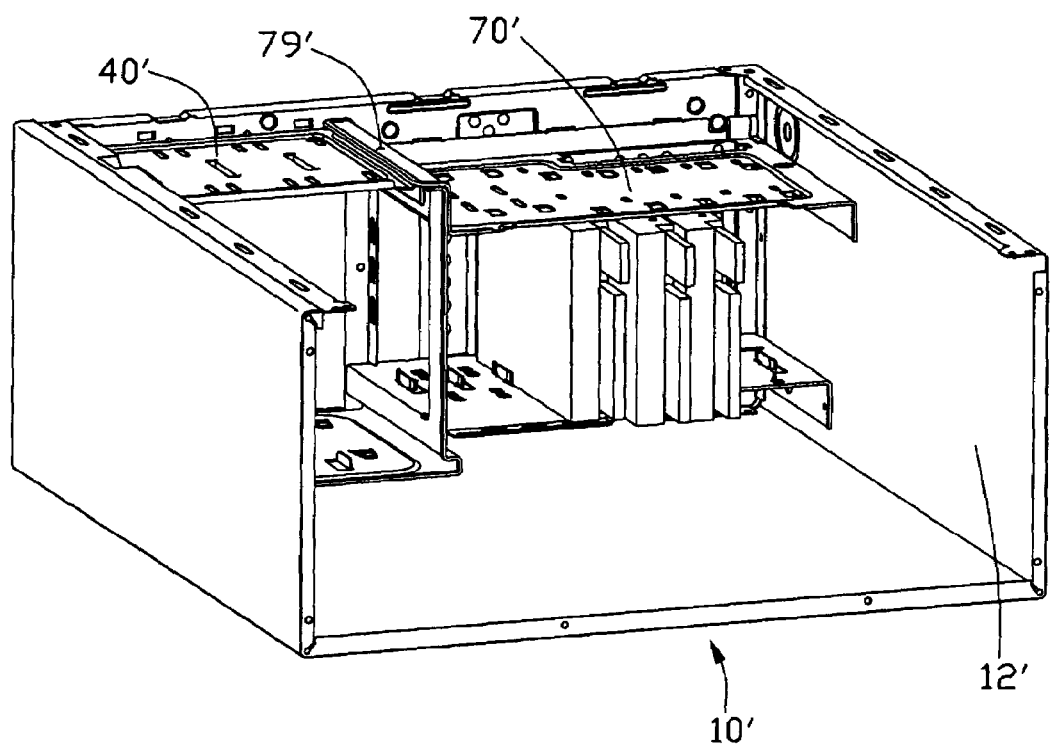
FIG. 10 is a fully assembled view of FIG. 9.

Referring to FIGS. 4–5, in assembly, firstly the chassis 10 is oriented so that the side plate 14 is bottommost. The disk drives 100 are received in the first receiving sections 64 of the fixed plate 60. Corresponding positioning pins 66 are inserted into the apertures of the side walls of the disk drives 100, to stably secure the disk drives 100. The tabs 98 of the fixing plate 70 are inserted into the receiving openings 32. The movable plate 70 is rotated down toward the fixed plate 60. The inserting tabs 88 are inserted into the cavities 23 of the bottom plate 12, and the first and second locking tabs 92, 82 are locked in the first and second locking holes 24, 50 respectively. The movable plate 70 is thus securely fixed in the chassis 10.

In disassembly, firstly, the first and second handles 94, 84 are pressed so that the first and second locking tabs 92, 82 are released from the first and second locking holes 24, 50. The movable plate 70 is rotated outwardly, and then pulled so that the tabs 98 are released from the receiving openings 32. The movable plate 70 is thus removed from the front plate 18, allowing convenient repair or replacement of disk drives 100.

FIGS. 6–10 show a computer enclosure in accordance with the alternative embodiment of the present invention. The computer enclosure includes a chassis 10', a mounting apparatus 40', and a movable plate 70'. The computer enclosure is similar to that of the preferred embodiment. The chassis 10' comprises a bottom plate 12', a front plate 18', and a side panel 48'. A first securing tab 26' is stamped perpendicularly upwardly from the bottom plate 12'. A first securing hole 28' is defined in the first securing tab 26'. A first fastening hole 49' is defined in a bottom portion of the side panel 48'. The movable plate 70' comprises a first flange 86' extending inwardly from a bottom thereof. A second securing tab 95' is stamped perpendicularly upwardly from the first flange 86', corresponding to the first securing tab 26'. A second securing hole 96' is defined in the second securing tab 95', and is aligned with the first securing hole 28'. A second flange 78' extends outwardly from a top of the movable plate 70'. A securing flange 80' extends perpendicularly upwardly from a distal end of the second flange 78', corresponding to the bottom portion of the side panel 48'. A second fastening hole 79' is defined in the securing flange 80', and is aligned with the first fastening hole 49'.

Assembly of the computer enclosure of the alternative embodiment is similar to that of the preferred embodiment. The movable plate 70' is perpendicularly attached to the front plate 18'. The securing flange 80' abuts against the bottom portion of the side panel 48', with the second fastening hole 79' being aligned with the first fastening hole 49'. The second securing tab 95' abuts against the first securing tab 26', with the second securing hole 96' being aligned with the first securing hole 28'. A fastener such as a screw (not shown) is extended through the first and second fastening holes 49', 79'. Another fastener such as a screw (not shown) is extended through the first and second securing holes 28', 96'. The movable plate 70' is thus securely attached to the chassis 10'.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A computer enclosure comprising:
   a chassis comprising a bottom plate and a front plate;
   a mounting apparatus fixedly mounted to the front plate, the mounting apparatus comprising a first bracket for receiving a plurality of disk drives therein and a fixed plate depending from one bottom side of the first bracket and fixed to the bottom plate of the chassis; and
   a movable plate detachably attached to the front plate and facing to the fixed plate, the movable plate comprising a first flange and a second flange at two opposite ends thereof securing to the bottom plate and the first bracket respectively;
   wherein the fixed plate and the movable plate cooperatively form a second bracket for receiving a plurality of disk drives therein.

2. The computer enclosure as claimed in claim 1, wherein the chassis further comprises a side plate and a top plate, and the top plate and the bottom plate extend perpendicularly from the side plate in a same direction, and the first bracket is fixed at respective ends of the top plate, the bottom plate and the side plate.

3. The computer enclosure as claimed in claim 2, wherein the first bracket comprises a bottom panel, a first side panel and a second side panel parallel to the first side panel, the bottom panel extends integrally from a bottom end of the first side panel and is secured with a bottom end of the second side panel by a fastener, the fixed plate integrally depends from a side of the bottom panel and is perpendicular to the front plate, and the second side panel is stamped perpendicularly from the front plate.

4. The computer enclosure as claimed in claim 3, wherein the movable plate comprises a main body, the first flange and the second flange extend perpendicularly from a bottom portion and the top portion respectively in opposite directions, and a third flange extends perpendicularly from the main body between the first flange and the second flange at an end thereof.

5. The computer enclosure as claimed in claim 4. wherein a plurality of vertically aligned receiving openings are defined in a side of the front plate below the second side panel, and a plurality of tabs extend from the third flange of the movable plate, the tabs inserting into corresponding receiving openings such that the movable plate can rotate about the tabs.

6. The computer enclosure as claimed in claim 5, wherein two protrusions are stamped from a portion of the bottom plate distal from the side plate, thereby defining two cavities, and two inserting tabs are respectively formed at two ends of the first flange of the movable plate for inserting into the cavities of the bottom plate correspondingly.

7. The computer enclosure as claimed in claim 5, wherein a first securing tab is stamped perpendicularly upwardly from the bottom plate, the first securing tab defines a first securing hole therein, a second securing tab is stamped perpendicularly upwardly from the first flange of the movable plate corresponding to the first securing tab, the second securing tab defines a second securing hole, and the second securing tab aligns with the first securing hole for extension of a fastener therethrough to thereby attach the first flange to the bottom plate.

8. The computer enclosure as claimed in claim 7, wherein the second side panel defines a first fastening hole, and a securing flange extends perpendicularly outwardly from a distal end of the second flange, the securing flange defines a second fastening hole, and the second fastening hole is aligned with the first fastening hole for extension of a fastener therethrough to thereby attach the securing flange to the first bracket.

9. The computer enclosure as claimed in claim 5, wherein a plurality of vertically aligned first supporting tabs is stamped inwardly from the fixed plate, a first receiving section is defined between each two adjacent first supporting tabs, a plurality of second supporting tabs is stamped inwardly from the main body corresponding to the first supporting tabs, and a second receiving section is defined between each two adjacent second supporting tabs cooperating with a corresponding first receiving section to receive a respective disk drive therebetween.

10. The computer enclosure as claimed in claim 9, wherein two positioning pins are stamped inwardly from the fixed plate generally between each of two adjoining first supporting tabs for insertion into apertures of a side wall of the respective disk drive, a front one of the positioning pins being oriented vertically, and a rear one of the positioning pins being oriented horizontally.

11. The computer enclosure as claimed in claim 4, wherein a first locking hole is defined in the bottom plate, a first resilient tab is formed from the first flange corresponding to the first locking hale, a first locking tab is stamped outwardly from the first resilient tab for engaging in the first locking hole and thereby attaching the first flange to the bottom plate.

12. The computer enclosure as claimed in claim 11, wherein the bottom panel comprises a bar connecting with the second side panel, the bar defines a second locking hole, a second resilient tab is formed from the second flange of the movable plate, and a second locking tab is formed on the second resilient tab for engaging in the second locking hole to thereby attach the second flange to the bar.

13. A computer enclosure for securing a plurality of disk drives each defining apertures in a side wall thereof, the computer enclosure comprising:

a chassis comprising a front plate and a bottom plate;

a mounting apparatus mounted to the front plate, the mounting apparatus comprising a first bracket for receiving some of the plurality of disk drives and a fixed plate integrally formed with the first bracket and fixed to the bottom plate of the chassis, a plurality of first supporting tabs being stamped from the fixed plate; and a movable plate detachably attached to the bottom plate and to the first bracket respectively, and parallel to the fixed plate, the movable plate and the fixed plate cooperatively forming a second bracket therebetween distinct from the first bracket, the movable plate comprising a plurality of second supporting tabs cooperating with the first supporting tabs to support said disk drives in the second bracket.

14. The computer enclosure as claimed in claim 13, wherein the first bracket comprises a bottom panel, a first side panel and a second side panel parallel to the first side panel, and the bottom panel extends integrally from a bottom end of the first side panel and is secured with a bottom end of the second side panel by a fastener, the fixed plate extends perpendicularly from an end of the bottom panel and is parallel to the first side panel, and the second side panel is stamped perpendicularly from the front plate.

15. The computer enclosure as claimed in claim 14, wherein the movable plate comprises a main body, a first flange extending perpendicularly from a bottom end of the main body for attaching to the chassis, a second flange extending perpendicularly from a top end of the main body in a direction opposite to that of the first flange for attaching to the second side panel, and a third flange extending perpendicularly outwardly from the main body between the first flange and the second flange.

16. The computer enclosure as claimed in claim 15, wherein the bottom plate defines a first locking hole, a first resilient tab is formed from the first flange corresponding to the first locking hole, and a first locking tab is stamped outwardly from the first resilient tab for engaging in the first locking hole to attach the first flange to the bottom plate.

17. The computer enclosure as claimed in claim 16, wherein the bottom panel comprises a bar connecting with the second side panel, the bar defines a second locking hole, a second resilient tab is formed from the second flange of the movable plate corresponding to the bar, and a second locking tab is formed in the second resilient tab for engaging in the second locking hole to attach the second flange to the bar.

18. The computer enclosure as claimed in claim 15, wherein a first securing tab is stamped perpendicularly upwardly from the bottom plate, the first securing tab defines a first securing hole, a second securing tab is stamped perpendicularly from the first flange of the movable plate corresponding to the first securing tab, and the second securing tab defines a second securing hole aligned with the first securing hole, whereby a fastener can be inserted through the first securing hole and the second securing hole to attach the first flange to the bottom plate.

19. The computer enclosure as claimed in claim 18, wherein the second side panel defines a first fastening hole, a securing flange extends perpendicularly outwardly from a distal end of the second flange, the securing flange defines a second fastening hole aligned with the first fastening hole, whereby a fastener can be inserted through the first fastening hole and the second fastening hole to attach the securing flange to the first bracket.

20. The computer enclosure as claimed in claim 15, wherein the front plate defines a plurality of receiving openings below the second side panel, and a plurality of tabs extends from the third flange of the movable plate, the tabs inserting into corresponding receiving openings such that the movable plate can rotate about the tabs.

21. A computer enclosure comprising:
  a chassis defining a front plate and opposite top and bottom plates;
  a mounting apparatus for receiving disk drives therein, located right behind the front plate and between the top and bottom plates, said mounting apparatus including:
  a first bracket located adjacent to the top plate, said first bracket being self-equipped with two opposite side faces and a bottom face perpendicular to said faces and parallel to said top and bottom plates, and
  a second bracket located below said first bracket and including
  a first vertical plate integrally extending from, via a splitting process, the bottom face, in parallel to said side faces, a bottom end of said first vertical plate seated upon the bottom plate; and
  a second vertical plate being discrete from said first bracket in a parallel relation therebetween after assembled, wherein
  said second vertical plate defines a front edge engaged with the front plate, and said second vertical plate is rotatable about a vertical axis, where an engagement between the second vertical plate and the front plate occurs, between a first position where said second vertical plate is not parallel to the first vertical plate, and a second position where said second vertical plate is parallel to the first vertical plate and opposite upper end and lower ends of said second vertical plate are respectively engaged with the first bracket and the bottom plate.

* * * * *